United States Patent [19]
Dickerson et al.

[11] Patent Number: 6,145,386
[45] Date of Patent: Nov. 14, 2000

[54] AIR FLOW TEST MACHINE FOR ROTORS

[75] Inventors: Weston E. Dickerson, Milford; John E. Saum, Okemos; Anwar R. Daudi, Ann Harbor, all of Mich.

[73] Assignee: Hayes Lemmerz International, Inc., Northville, Mich.

[21] Appl. No.: 09/057,425

[22] Filed: Apr. 8, 1998

Related U.S. Application Data

[60] Provisional application No. 60/069,069, Dec. 10, 1997.

[51] Int. Cl.$^7$ ...................................................... G01P 5/06
[52] U.S. Cl. ........................................................ 73/861.85
[58] Field of Search ........................... 73/861.85, 861.87; 188/264 A, 218 XL, 18 A, 264 AA

[56] References Cited

U.S. PATENT DOCUMENTS

5,517,862   5/1996   Berrong et al. ....................... 73/861.85

Primary Examiner—William Oen
Attorney, Agent, or Firm—Marshall & Melhorn

[57] ABSTRACT

The invention relates to an air flow test apparatus for determining the amount of air moving through vents in a turning ventilated rotor. The air flow test apparatus includes an elongated cylindrical shaft journalled for rotation in spaced apart bearing blocks mounted in a frame. A conventional belt drive couples the shaft to a variable speed motor for rotation. An adapter is mounted to the shaft and a work piece is mounted to the adapter end for rotation with the shaft. The work piece includes a hub secured to the adapter for receiving a plurality of different sized rotors, and a ventilated rotor mounted to the hub. The work piece may also include other vehicle components such as the caliper, a wheel, even an entire corner portion of a vehicle for simulation purposes. A pressure gauge is disposed adjacent the rotor, near the vents, to measure the air pressure near the turning rotor. The cooling effectiveness of the ventilated rotor can be determined by the amount of air moved through the vents which is proportional to the change in pressure of the moving air.

12 Claims, 9 Drawing Sheets

AIR FLOW TEST MACHINE FOR ROTORS

RELATED APPLICATION

This application claims the benefit of U.S. Provisional Application No. 60/069,069, filed Dec. 10, 1997. The provisional application, Ser. No. 60/069,069, is hereby incorporated by reference in its entirety.

BACKGROUND OF INVENTION

The present invention relates to an apparatus for measuring the air flow around a turning rotor. More specifically, the present invention measures the air flow exiting the cooling vents of a turning rotor.

Wheeled vehicles are typically slowed and stopped with a braking system that generates frictional forces. Many braking systems include a rotor attached to one or more of the vehicle wheels for rotation therewith, and a caliper assembly secured to a non-rotating component of the vehicle, such as the vehicle frame. The rotor includes an annular peripheral section having friction surfaces disposed on opposite sides. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted throughout the rotor.

It is important to dissipate the heat and cool the rotor. If the rotor is not adequately cooled, the heat generated during braking can build up in the rotor and reduce braking performance by creating longer stopping distances, shorten the life of the rotor, or even cause brake failure. The rotor also helps to keep the brake pads cool by absorbing the braking heat and moving it away from the pads. However, the rotor can only absorb a finite quantity of heat. An inadequately cooled rotor will approach its heat storage capacity and absorb less heat, causing the brake pads to overheat thus reducing braking performance and the life of the brake pads.

Rotors are commonly cooled using moving air which absorbs the heat from the rotor and carries it away. It is known to "ventilate" the rotors by forming holes or vents through the friction surfaces. As the rotor turns, air is moved through the vents. The moving air absorbs heat from the rotor friction surfaces and cools the rotor. Other ventilated rotors include outer friction surfaces formed on a pair of annular friction plates joined together by spacers or posts in a mutually parallel, spaced apart relationship to form spaces or vents therebetween. The vents are open at the radially inner and outer edges of the friction plates to form air passages between the friction plates. As the vented rotor turns, air forced through the vents between the friction surfaces absorbs heat from the friction plates and cools the rotor. Other portions of the rotor are also cooled as the air moves past them and through the vents. The cooling effectiveness of the vents is proportional to the quantity of air passing through the vents. The more air which moves through the vents and past the rotor surfaces, the more heat that is dissipated and the greater the cooling effects. Therefore, it is desirable to move as much air as possible through the vents.

The shape, spacing and orientation of the posts determine the amount of air which passes through the vents. When designing the vents to most effectively cool the rotor, the shape, spacing and orientation of the posts must be optimized to move the greatest amount of air. It is desirable to provide an air flow test apparatus for measuring the amount of air moving through the vents when the rotor is turning in order to quantify the cooling effectiveness of a particular vent design.

SUMMARY OF INVENTION

The invention relates to an air flow test apparatus for determining the amount of air moving through vents in a turning ventilated rotor. In the preferred embodiment, the air flow test apparatus includes an elongated cylindrical shaft journalled for rotation in spaced apart bearing blocks. A frame supports the bearing and shaft, and includes a pair of vertical support columns extending from a common base. A conventional belt drive couples the shaft to a variable speed motor for rotation. An adapter is mounted to the shaft for rotation therewith. A work piece is mounted to the adapter end. The work piece includes a hub secured to the adapter for receiving a plurality of different sized rotors, and a ventilated rotor mounted to the hub. The work piece may also include other vehicle components such as the caliper, a wheel, even an entire corner portion of a vehicle for simulation purposes. A control panel may be provided for selecting the speeds of rotation of the rotor for simulating different vehicle speeds. A pressure gauge is disposed adjacent the rotor, near the vents, to measure the air pressure near the turning rotor. The pressure gauge may be referenced to atmospheric pressure to measure the change in pressure of the air moving through the vents. The cooling effectiveness of the ventilated rotor can be determined by the amount of air moved through the vents which is proportional to the change in pressure of the moving air. This invention may also be practiced by measuring the velocity of the air moving through the cooling vents.

This invention also relates to a method for determining amount of air moving through the vents of a turning ventilated rotor. The first step is securing the rotor to the shaft for rotation. The second step is turning the shaft and rotor are at a preselected speed. The third step is measuring the pressure of the air moving through the vents of the turning rotor. The fourth step includes determining the cooling effectiveness of the vents using the change in pressure created by the turning ventilated rotor. The cooling effectiveness may be determined as the heat transfer coefficient.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENT

Figure 1:
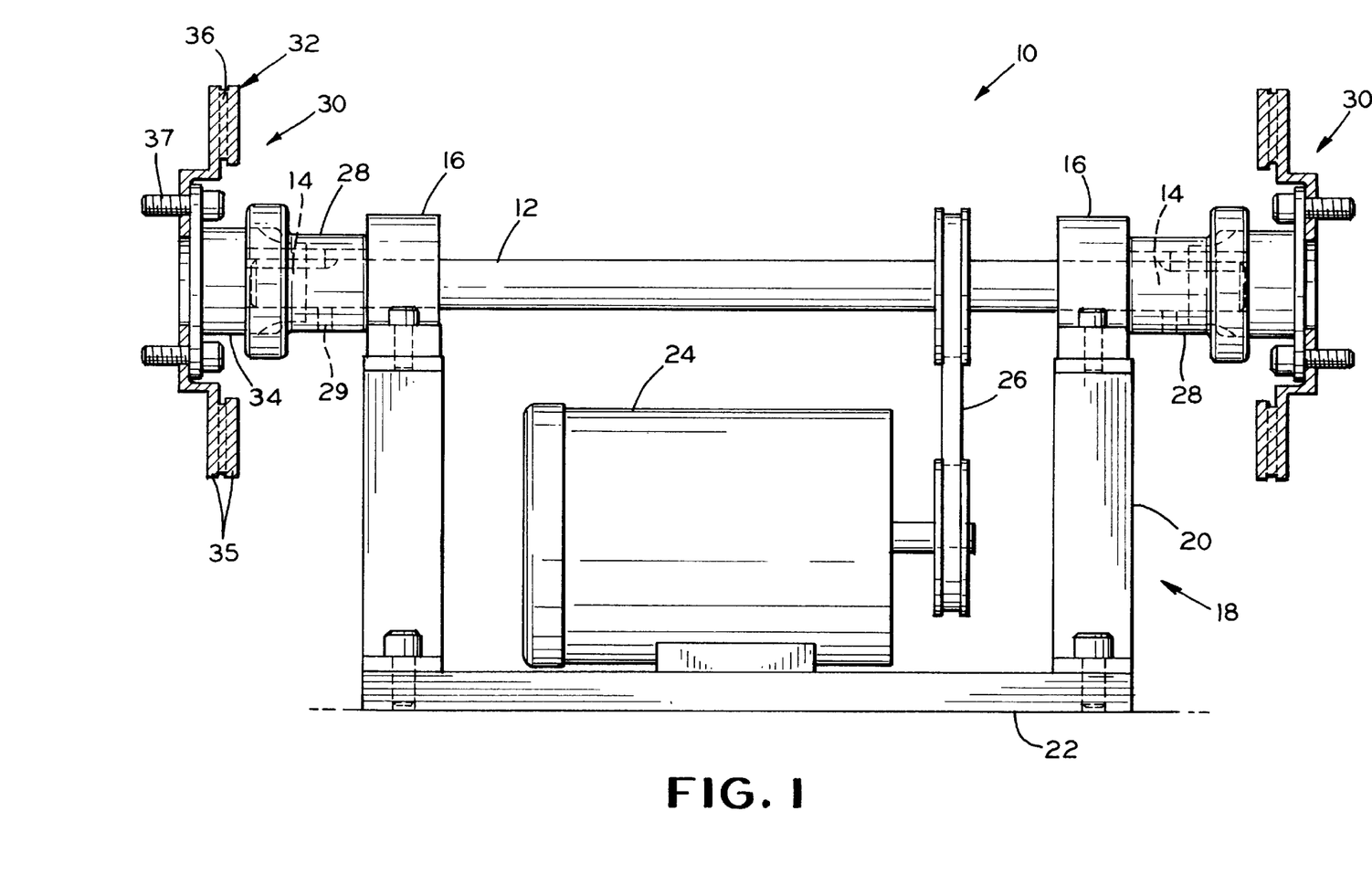
FIG. 1 is a schematic elevational view of the air flow test apparatus in accordance with the invention.

Referring now to the drawings, there is illustrated in FIG. 1 an air flow test apparatus 10 for measuring the amount of air flowing through vents in a turning ventilated rotor constructed in accordance with the present invention. The air flow test apparatus 10 includes an elongated cylindrical shaft 12 with two ends 14, disposed for rotation in a pair of spaced apart bearings 16. Preferably each of the bearings 16 are a sleeve bearing pillow block, however, any suitable bearings may be used. The bearings 16 are disposed in a frame 18 having a pair of vertical support members 20 attached to the bearings 16 for supporting the shaft 12 in a generally horizontal position. The support members 20 extend from a base 22 (described in detail below).

The apparatus 10 further includes a motor 24, drivingly coupled to the shaft 12 to rotate the shaft when the motor is operated. In FIG. 1, the motor 24 shown is an electric motor, however, any suitable motor may be used. Preferably, the motor 24 is a variable speed motor capable of turning the shaft 12 at different, selectable speeds of rotation. Alternatively, a single speed motor may be used to practice the invention.

The motor 24 is preferably connected to the shaft 12 by a belt drive 26, although drives such as a chain drive, gear drive, or any other suitable drive for drivingly connecting the shaft 12 to the motor 24 for rotation therewith may be used. Alternatively, this invention may still be practiced with the motor 24 directly driving the shaft 12.

An adapter 28 is secured to each end of the shaft 12 for rotation therewith by a setscrew 29. A work piece 30 is secured to the adapter for rotation with the shaft 12. The work piece 30 includes a ventilated rotor 32, and a hub 34 for releasably mounting the rotor to the adapter 28. Preferably, a separate rotor 32 is mounted to the hub 34 with a conventional fasteners 37 as shown in FIG. 1, however, an integral rotor and hub may be used (as described below). The hub 34 is preferably a universal hub for mounting an assortment of different rotors to the adapter. The universal hub includes a plurality of holes (not shown) arranged in a universal pattern for matching the fastener hole pattern (not shown) of an assortment of different rotors. In the alternative, the hub 34 may be have a specific fastener hole pattern for mounting a particular rotor to the adapter 28.

The vented rotor 32 includes a pair of annular friction plates 35 joined together by spacers or posts 36 in a mutually parallel, spaced apart relationship to form spaces or vents 38 therebetween. The vents 38 are open at the radially inner and outer edges of the friction plates 35 to form air passages between the friction plates. As the vented rotor turns, air forced through the vents 38 between the friction surfaces 35 absorbs heat from the friction plates and cools the rotor. Alternatively, the rotor may have a single friction plate (not shown) with cross vents drilled therethrough.

Figure 2:
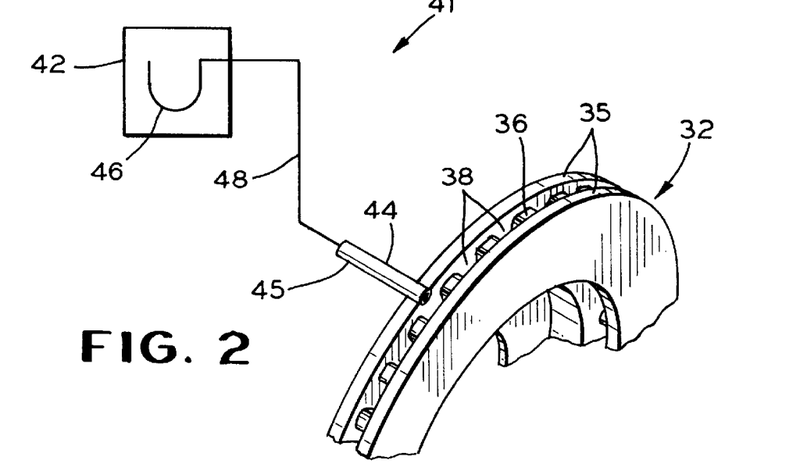
FIG. 2 is an enlarged sectional view of the rotor vents and air flow measuring apparatus in accordance with the invention.

Referring now to FIG. 2, the air flow test apparatus 10 further includes data retrieval and manipulation equipment 41 for determining the quantity of air moving through the vents 38 when the rotor is turned on shaft 12. The data retrieval and manipulation equipment 41 includes a pressure gauge 42 having a pressure sensor 44 disposed near the rotor vents 38 for measuring the change in pressure near the vents 38 as the rotor 32 turns on the shaft 12. Preferably, the pressure gauge 42 includes a standard Pitot Tube 45 supported adjacent the rotor vents 38 by a stand (not shown) and attached to a manometer 46 by a tube 48. The manometer is preferably a U-tube manometer, however any conventional manometer may be used.

The pressure gauge 42 is preferably exposed to atmosphere to provide a pressure differential between atmospheric pressure and the pressure adjacent the vents of the turning rotor 32, however a separate pressure gauge for reading atmospheric pressure may be used. The pressure differential is used to determine the velocity of the air moving through the vents 38 when the rotor turns. The air velocity can then be used to calculate the air flow through the vents in a known and conventional manner. A derivation of this embodiment may determine the quantity of all of the air moving around the rotor, including the air moving through the vents 38 as well as the air moving around the perimeter of the rotor 32. Alternatively, an electronic pressure sensor (not shown) or any suitable pressure sensor may be used. The electronic pressure sensor may be connected to a conventional computer which interprets the pressure differential and calculates the quantity of air moving through the vents in a known manner.

Figure 3:
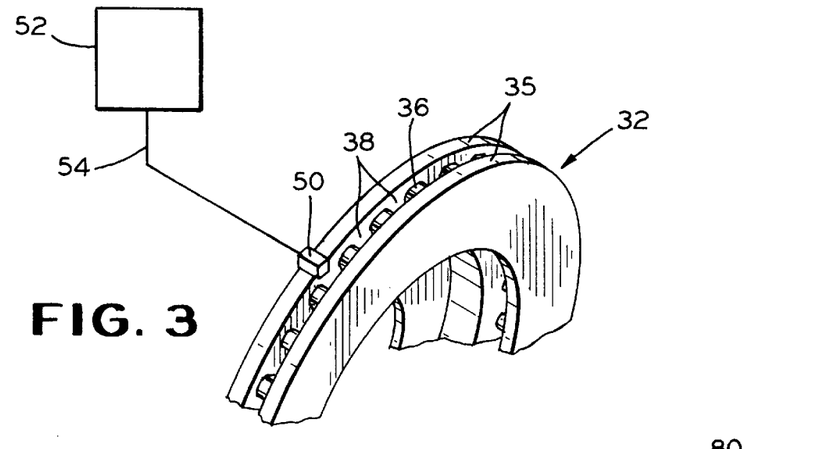
FIG. 3 is an enlarged sectional view of the rotor vents and air flow measuring apparatus in accordance with the invention.

Referring now to FIG. 3, an alternate embodiment of the data retrieval and manipulation equipment 41 includes an air velocity sensor 50 for measuring the velocity of air exiting the vents 38. The air velocity sensor 50 is connected to an electronic gauge 52 via wire 54 which indicates the air velocity near the vents 38 of the turning rotor 32. The air velocity near the vents is used to determine the quantity of air moved through the vents in a known manner. Alternatively, the air velocity sensor 50 may be connected to a conventional computer (not shown) which uses the air velocity to calculate the quantity of air moving through the vents in a known manner. The computer may be provided to record data such as the speed of rotation, the change in pressure, the temperature, etc. for use in determining the preferred rotor. A derivation of this embodiment may determine the quantity of all of the air moving around the rotor, including the air moving through the vents 38 as well as the air moving around the perimeter of the rotor 32.

The base plate 22 is connected to the vertical support columns 20 of the frame for providing a rigid support structure for the frame 18. The base plate 22 must be of sufficient weight to provide a counter weight for mounting a corner portion of a vehicle to the apparatus without upsetting or overturning the apparatus. In the preferred embodiment, the base plate 22 is constructed from steel plate. Other materials of construction are suitable as long as the base plate provides sufficient counter weight.

Figure 4:
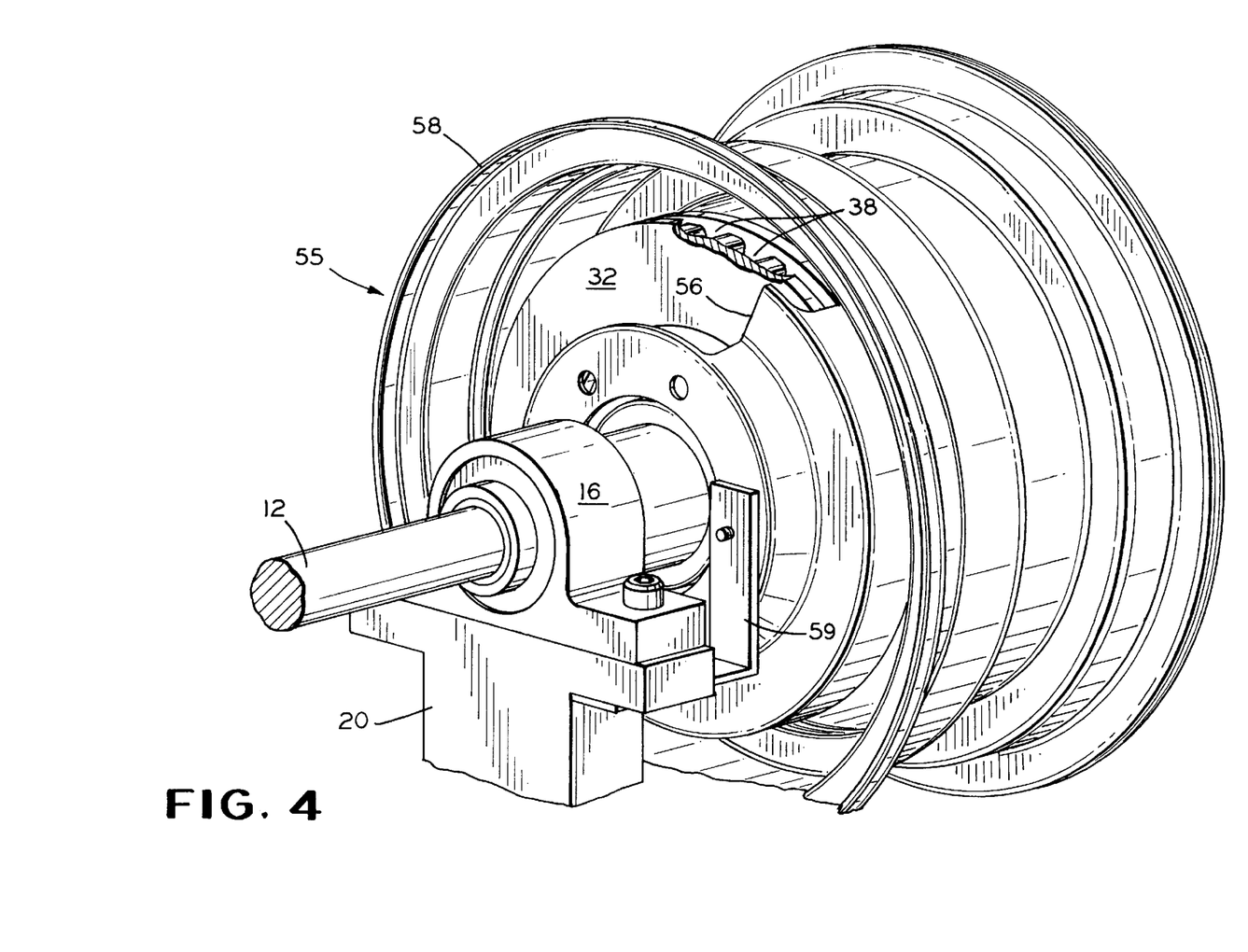
FIG. 4 is a schematic elevational view of a vehicle components mounted adjacent the rotor for simulating vehicle operating conditions in accordance with the invention.

Referring now to FIG. 4, various vehicle components 55 are shown mounted to the apparatus 10 adjacent the rotor 32.

Such components include an air deflection shield 56, and a wheel 58. Additionally, a caliper (not shown), a knuckle (not shown), and even an entire corner portion of a vehicle (not shown) may be used for simulating the operation of the turning rotor on a vehicle. The air deflection shield 56 is stationary and is secured to the air flow test apparatus 10 via bracket 59. The wheel 58 is secured to the rotor 32 and rotates with the rotor. The rotor 32 is turned with the vehicle components 55 mounted as shown, and the air flow measurements are taken with the data retrieval and manipulation equipment 41 as described above.

Figure 5:
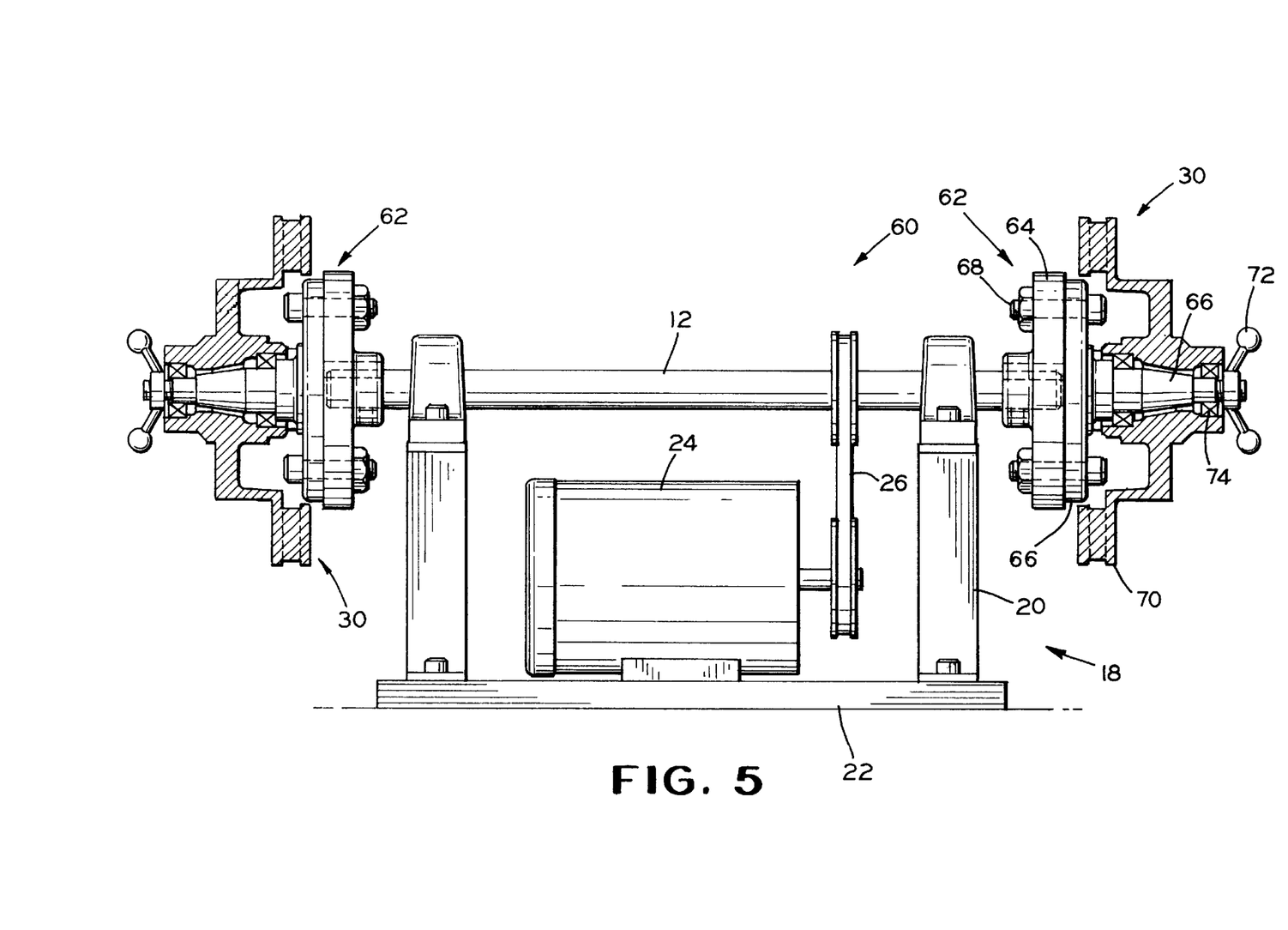
FIG. 5 is a schematic elevational view of a second embodiment of the air flow test apparatus in accordance with the invention.

Referring now to FIG. 5, an alternate embodiment of the apparatus 60 is shown with components similar to the apparatus of FIG. 1 illustrated with identical reference numerals. An adapter 62 is secured to the shaft 12 for rotation therewith. The adapter 62 includes an adapter plate 64 for mounting a spindle 66 thereto with fasteners 68 in a conventional manner. The work piece 30 includes a integrated hub and rotor 70 attached to the spindle 66 by a conventional nut, such as a wing nut 72, secured to a threaded portion (not shown) on the spindle. Conventional bearings 74 or other spacers may be used between the spindle 66 and rotor 70 to provide a snug fit when the nut is tightened to secure the rotor 70 to the spindle 66 for rotation with the shaft 12.

Figure 6:
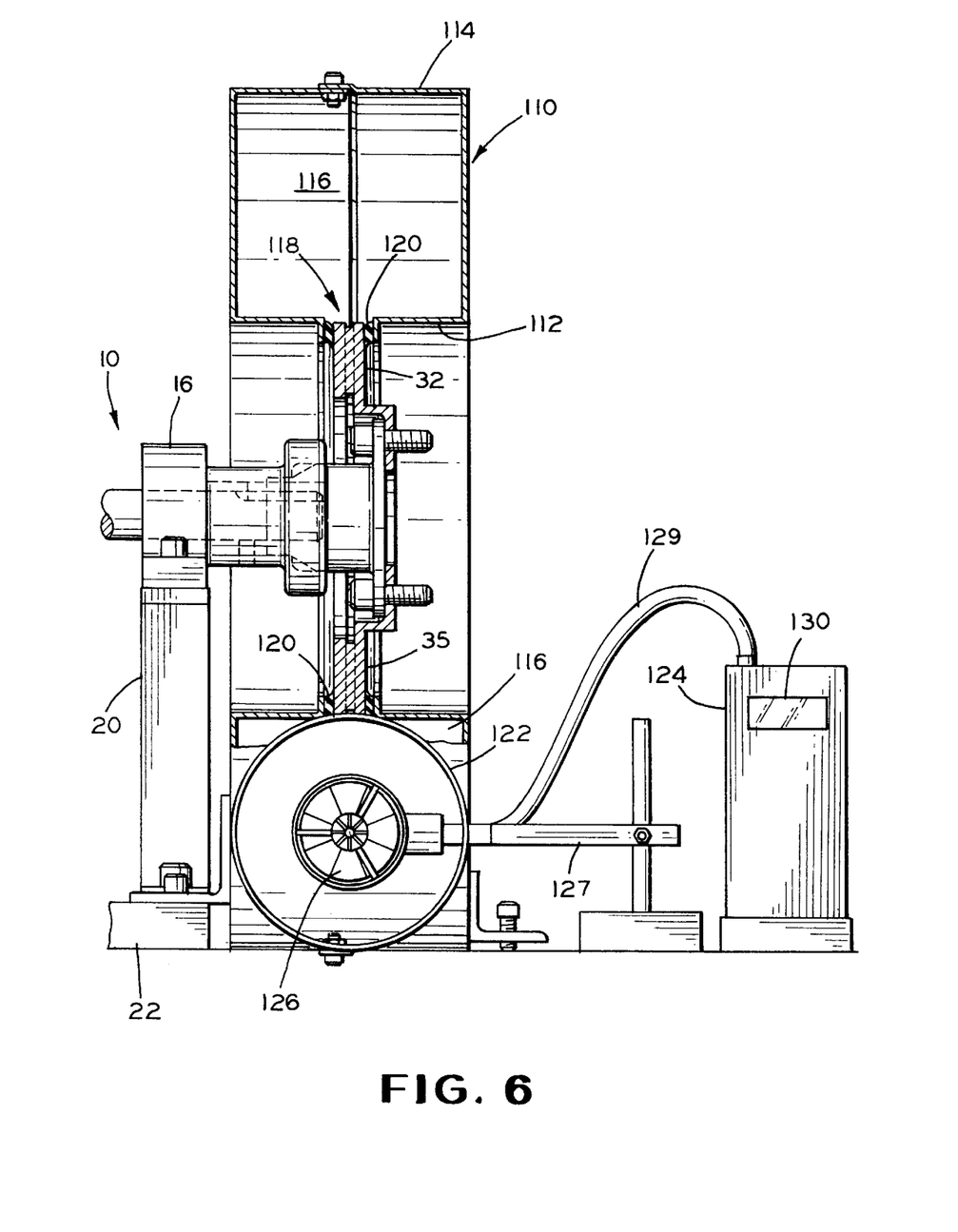
FIG. 6 is a schematic sectional elevational view of a third embodiment of the air flow test apparatus in accordance with the invention.
Figure 7:
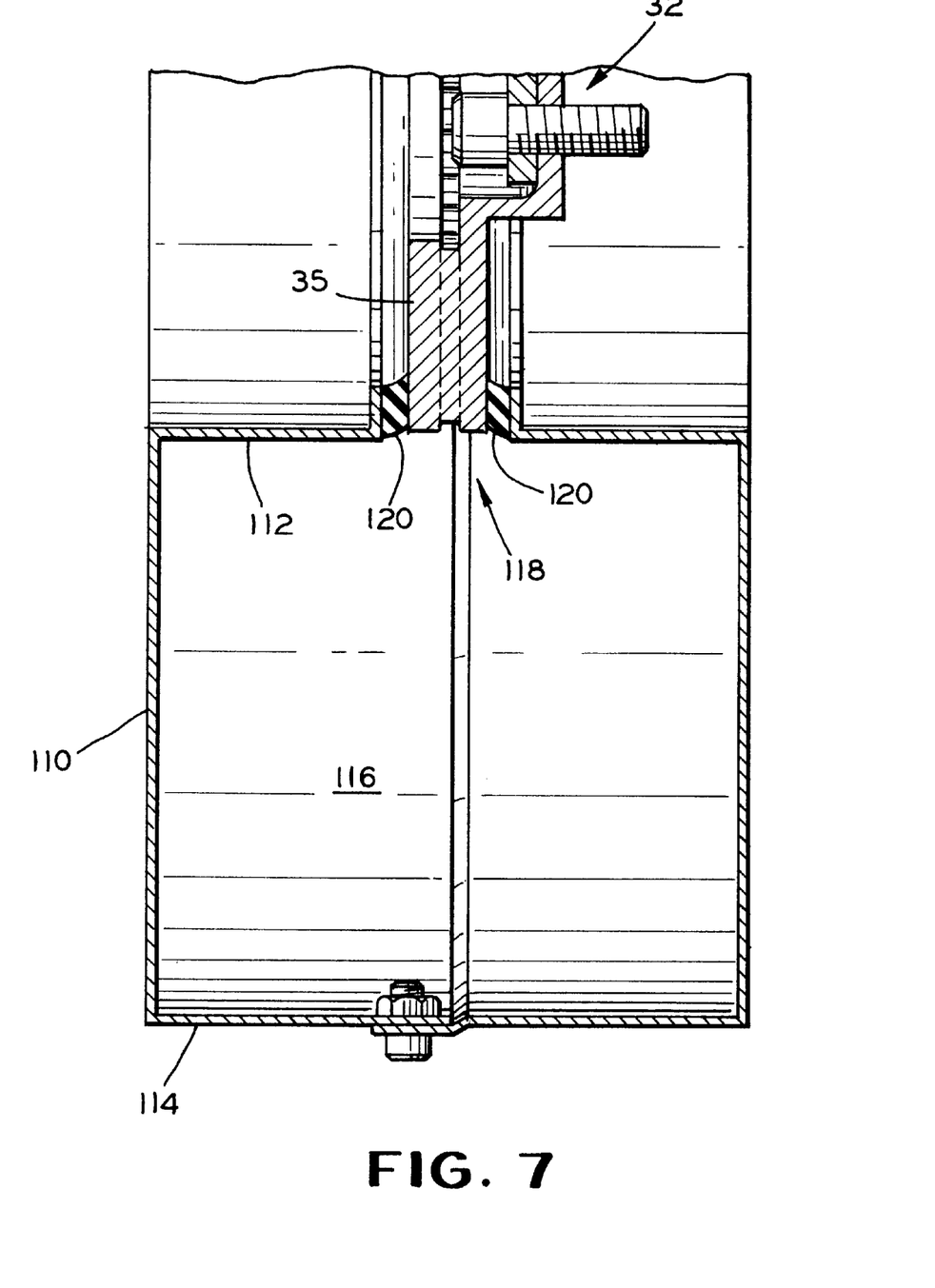
FIG. 7 is an enlarged sectional elevational view of the air flow test apparatus illustrated in FIG. 5.
Figure 8:
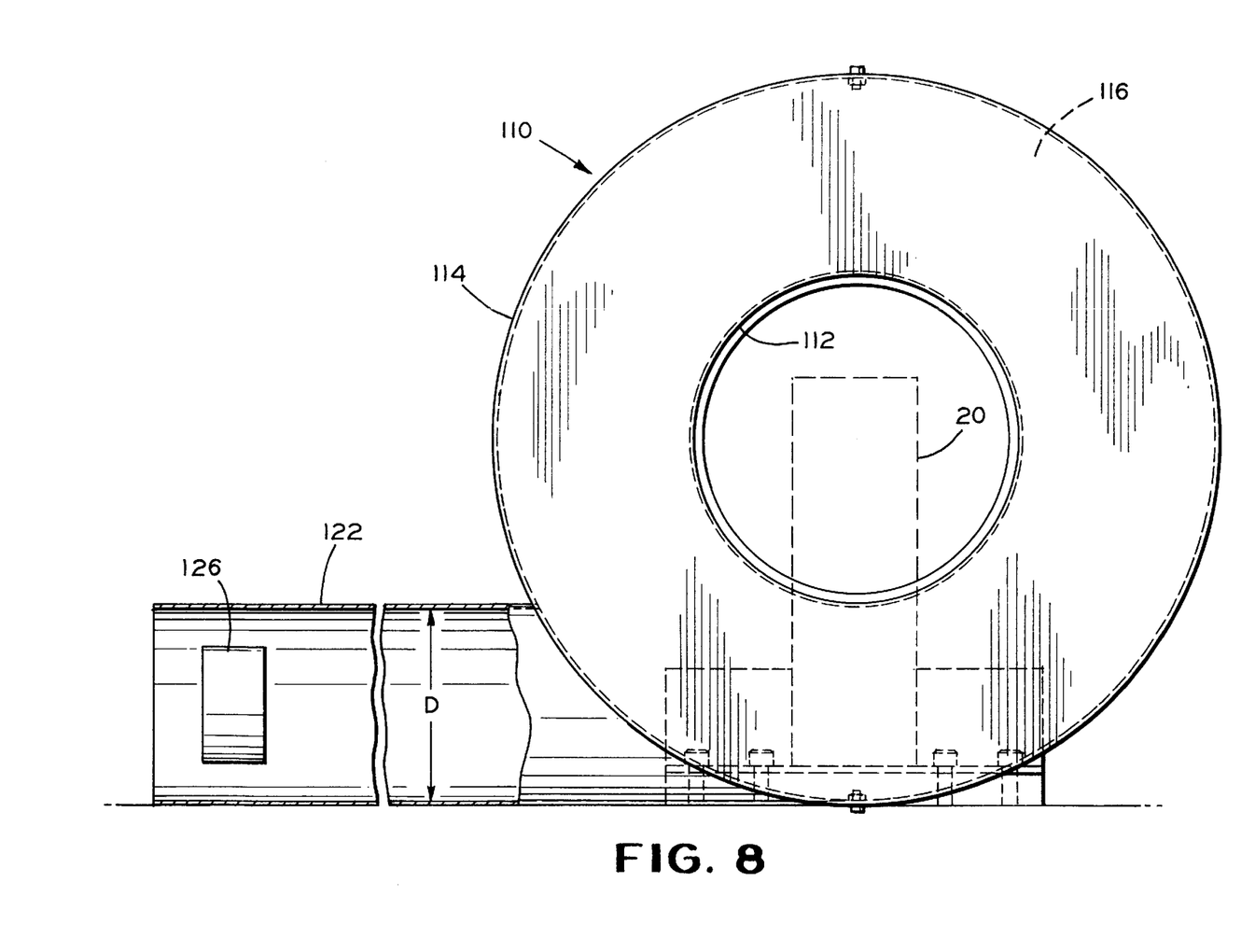
FIG. 8 is an elevational view of the third embodiment of the air flow test apparatus illustrated in FIG. 5.

Referring to FIGS. 6, 7 and 8, a second alternate embodiment of the invention is illustrated. The air flow test machine 10 includes a convoluted duct 110 surrounding the rotor 32. The duct 110 is annular having a radially inner wall 112 and a radially outer wall 114 forming an annular cavity 116 therebetween. A circular slot or port 118 is disposed approximately in the center of the radially inner wall 112. A lip seal 120 is disposed on each axial side of the circular port 118 to form an opposed pair facing each other.

A pipe 122 which is open at each end extends from the duct 110 and communicates the cavity 116. The pipe 122 has a predetermined diameter D. The pipe 122 has a predetermined length, preferably approximately four feet, although any suitable length may be used. An air velocity measurement apparatus or anemometer 124 includes a velocity sensor 126 which is mounted in the pipe 122 at the end opposite the duct 110, for determining the velocity of moving air in the pipe 122. The velocity sensor 126 is preferably a vane type velocity sensor, although any suitable air velocity measurement sensor may be used. The air velocity sensor 126 is preferably disposed in the center of the pipe 122 and supported by a stand 127 which extends through the wall of the pipe 122. The air velocity sensor 126 communicates with the anemometer 124 via an extension cable 129. The anemometer 124 includes a display 130 for indicating the air velocity at the sensor 126 within the pipe 122.

The duct 110 is placed over the rotor 32 such that the lip seals 120 abut the outer surfaces of the friction plates 35. The lip seals 120 press against the friction plates 35 as the rotor 32 turns, forming an airtight seal which prevents air from exiting the cavity 116 past the outer surfaces of friction plates 35. Although lip seals are preferred, any suitable seal may be used.

During operation of the test machine 10, the rotor 32 is turned while the duct 110 is held stationary by a fixture (not shown). The air moved through the rotor vents 38 flows into the cavity 116 and into the pipe 122. The pipe 122 has a sufficient length to record an accurate airspeed at the air velocity sensor 126 within the pipe. The air flow from the rotor 32 can then be calculated from multiplying the air velocity at the sensor 126 by the cross sectional area of the pipe 122.

Figure 9:
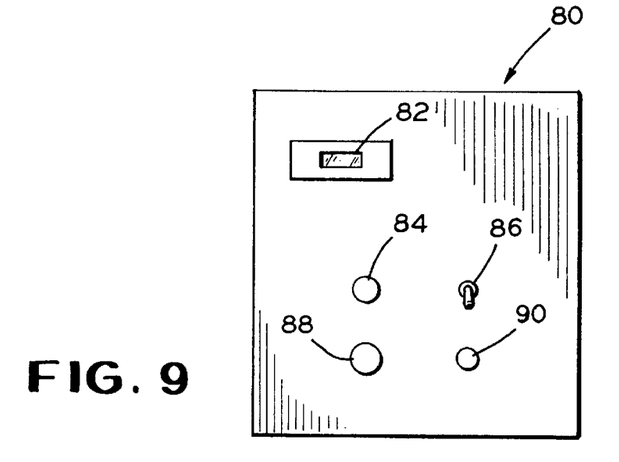
FIG. 9 is an elevational view of the control panel of the invention in accordance with the invention.

Referring to FIG. 9, a control panel 80 for operating the apparatus 10 is illustrated. The control panel 80 is conventional, and includes a display 82 for indicating the speed of rotation of the work piece 30, a variable speed control 84 for adjusting the speed of rotation of the work piece 30, a power switch 86, a start/run switch 88, and an emergency stop switch 90. Preferably the display 82 is a digital display having liquid crystal or LED numerals, although an analog display such as a graph may be used. The variable speed control 84 is connected to the variable speed motor 24 and allows the operator to preselect a desired speed of rotation of the work piece 30. The speed control 84 is calibrated in conjunction with the motor 24, such that the motor 24 rotates at the rate of speed an operator selects.

The power switch 86 is a conventional power switch, for controlling the flow of power to the motor 24. The start/run switch 88 is a conventional switch which starts the motor 24 rotating. The emergency stop switch 90, commonly known as the "kill" switch, is provided. It will terminate the flow of power to the motor 24 and may be used to stop the apparatus 10 in case of an emergency.

Figure 10:
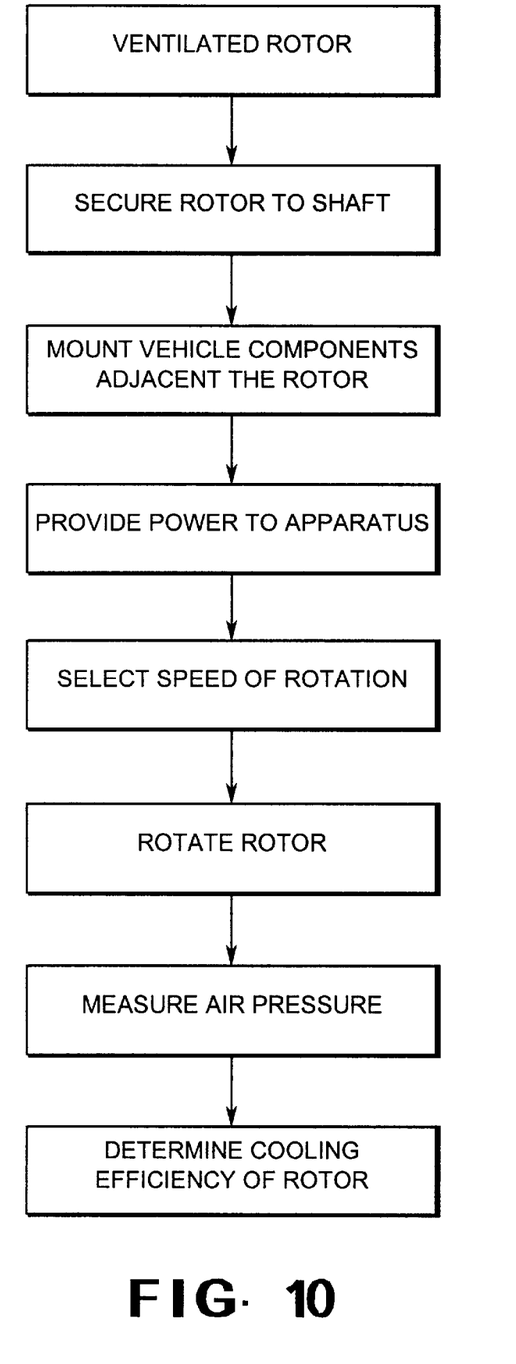
FIG. 10 is a flow diagram illustrating the sequence of steps for measuring the air pressure near the turning rotor for determining the cooling effectiveness of the rotor in accordance with the invention.
Figure 11:
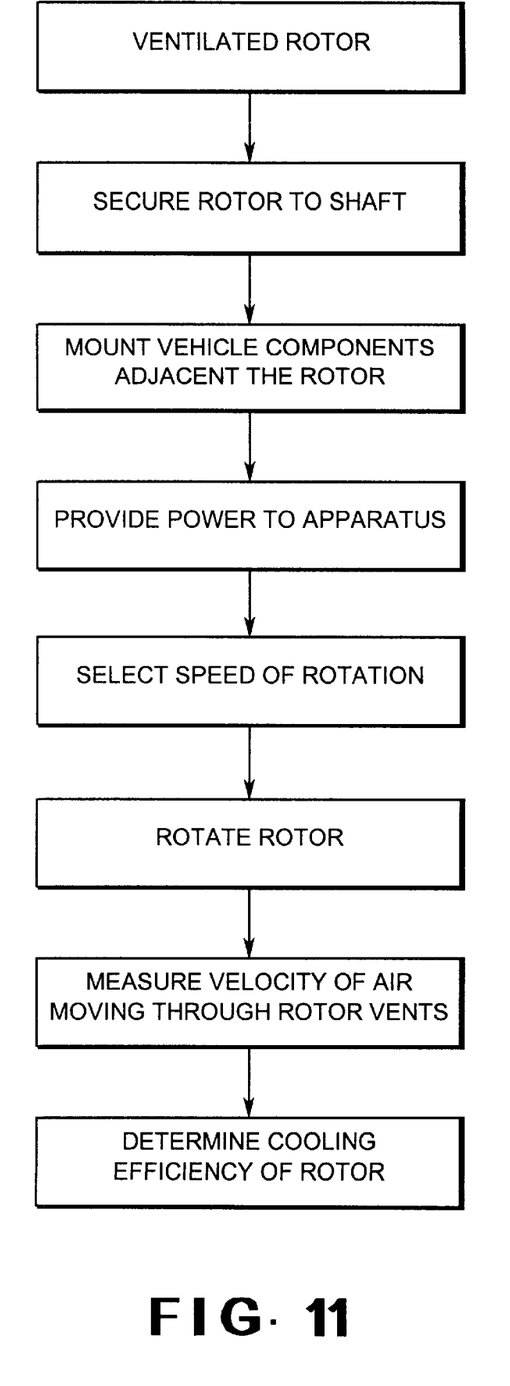
FIG. 11 is a flow diagram illustrating the sequence of steps for measuring the air velocity from the air exiting the vents of the rotor for determining the cooling effectiveness of a rotor in accordance with the invention.

Referring now to FIGS. 10 and 11, a preferred sequences of steps for determining the cooling effectiveness a rotor 32 with a plurality vents will be discussed. The air pressure near the vents, the air velocity of the air exiting the vents and the air flow moved through the vents by the turning rotor are convenient parameters which may be used to compare the cooling efficiency of different rotors tested. Initially a ventilated rotor 32 is secured to the hub 34 for rotation. Next, various vehicle components are mounted to the apparatus 10 or adjacent the rotor for simulating the operation of the rotor 32 on a vehicle. Such components may include an air deflection shield, a caliper, a knuckle, and a wheel or even an entire corner portion of a vehicle. Next the power is provided to the air flow test apparatus 10. The speed of rotation of the rotor is then selected and the shaft is rotated at the selected speed. Once the rotor is rotating at the preselected speed, the pressure gauge measures the change in air pressure adjacent the cooling vents. The air velocity is then determined which is used to determined the cooling effectiveness of the rotor in a known manner.

Alternatively, the air velocity of the air exiting the vents of the turning rotor is determined as shown in FIG. 10. The air velocity is then used to determine the cooling effectiveness of the rotor. Furthermore, the air velocity may be used to determine the air flow which is used to determine the cooling effectiveness of the rotor.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

What is claimed is:

1. An apparatus for measuring the amount of air flowing through vents in a turning ventilated rotor, comprising:

an elongated cylindrical shaft disposed for rotation in a bearing;

a ventilated rotor mounted to said shaft for rotation therewith, said ventilated rotor having a plurality of vents for moving air therethrough when said rotor is turned;

a duct mounted over said rotor and having a cavity for receiving the air moved by said ventilated rotor; and an anemometer communicating with said cavity for measuring the velocity of air moved by said rotor when turned.

2. The invention defined in claim 1 wherein said duct further includes seals for abutting said rotor to prevent air leaking from said cavity between said rotor and said duct.

3. The apparatus defined in claim 1 further including a frame connected to said bearing for supporting said shaft.

4. The apparatus defined in claim 1 further including a motor drvingly connected to said shaft for rotating said shaft.

5. The apparatus defined in claim 1 wherein said duct is a convoluted duct having a radially inner wall and a radially outer wall and said cavity is an annular cavity disposed between said radially inner and radially outer walls.

6. The apparatus defined in claim 2 wherein the rotor includes a pair of spaced apart friction plates having outer surfaces and the vents extend between said friction plates, and said seals abut said outer surfaces of said friction plates.

7. The apparatus defined in claim 2 wherein said seals are lip seals.

8. The apparatus defined in claim 1 further including a pipe extending from said duct and communicating with said cavity.

9. The apparatus defined in claim 8 wherein said pipe has a predetermined diameter and a predetermined length.

10. The apparatus defined in claim 8 wherein said anemometer includes a velocity sensor mounted in said pipe for measuring the air velocity moving through said pipe.

11. The apparatus defined in claim 10 wherein said velocity sensor is a vane type velocity sensor.

12. The apparatus defined in claim 1 further including a control panel having a variable speed control for adjusting the speed of rotation of the rotor.

* * * * *